United States Patent
Koyano

(10) Patent No.: US 8,625,147 B2
(45) Date of Patent: Jan. 7, 2014

(54) PRINTING METHOD AND INFORMATION PROCESSING APPARATUS FOR TRANSMITTING PRINTING INSTRUCTION TO PRINTING APPARATUS FOR CAUSING THE PRINTING APPARATUS TO PERFORM RECORDING USING A TRANSPARENT RECORDING MATERIAL

(75) Inventor: Hiroki Koyano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 12/257,291

(22) Filed: Oct. 23, 2008

(65) Prior Publication Data
US 2009/0109457 A1  Apr. 30, 2009

(30) Foreign Application Priority Data

Oct. 29, 2007  (JP) ................................. 2007-280437

(51) Int. Cl.
*G06K 15/00* (2006.01)
*G06F 3/12* (2006.01)
*G06F 15/00* (2006.01)

(52) U.S. Cl.
USPC ............................ 358/1.18; 358/1.1; 358/1.9

(58) Field of Classification Search
None
See application file for complete search history.

(56) References Cited

U.S. PATENT DOCUMENTS

| | | | | |
|---|---|---|---|---|
| 6,000,723 A | * | 12/1999 | Fujimoto | 281/38 |
| 6,614,931 B1 | * | 9/2003 | Nalder | 382/187 |
| 2002/0071682 A1 | * | 6/2002 | Iguchi et al. | 396/564 |
| 2005/0141942 A1 | * | 6/2005 | Someno | 400/76 |
| 2008/0258454 A1 | * | 10/2008 | Bhatt et al. | 283/67 |

FOREIGN PATENT DOCUMENTS

| | | |
|---|---|---|
| JP | 01-085766 A | 3/1989 |
| JP | 2004-223762 A | 8/2004 |
| JP | 2007-052175 A | 3/2007 |

* cited by examiner

*Primary Examiner* — Vincent Rudolph
(74) *Attorney, Agent, or Firm* — Canon U.S.A., Inc. IP Division

(57) ABSTRACT

A printing method for performing printing of paper having a user entry field, which is a region into which a user performs writing after printing is performed, includes setting a transparent recording material setting for the user entry field; and causing a printing unit to perform recording, by using a transparent recording material, for the user entry field for which the transparent recording material setting has been set.

7 Claims, 7 Drawing Sheets

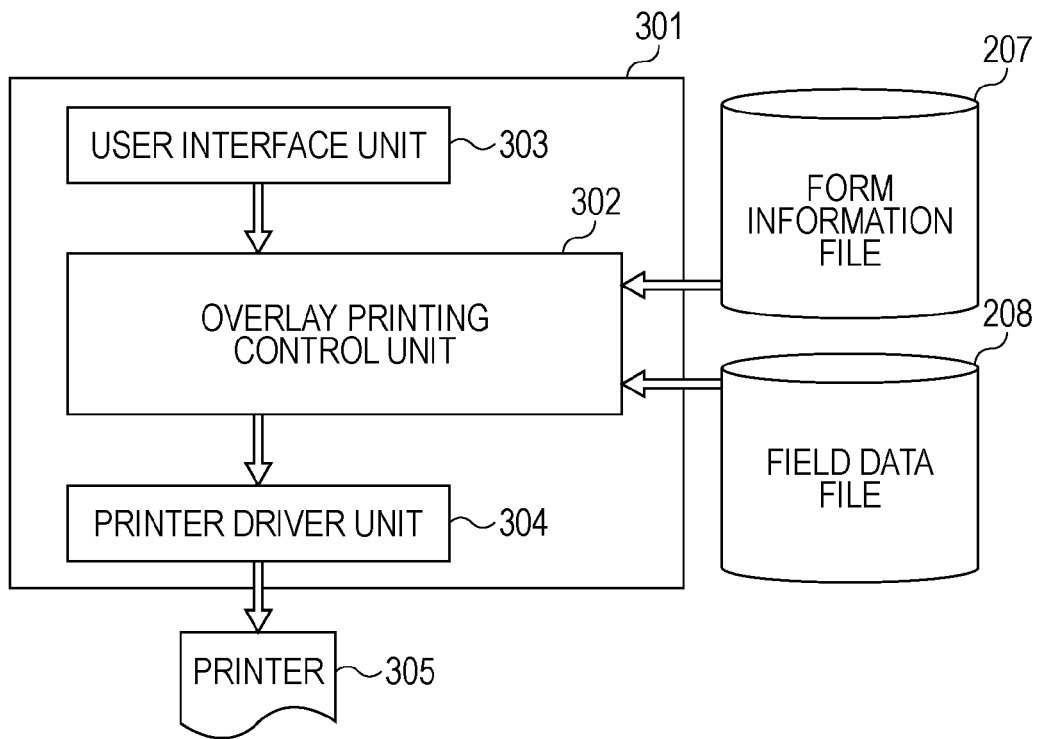

```
Function (START OVERLAY PRINTING);
Function (FORM INFORMATION FILE);
Function (CLEAR TONER PROCESSING=FIELD PATTERN(NAME));
Function (CLEAR TONER PROCESSING=FIELD PATTERN(ADDRESS));
Function (CLEAR TONER PROCESSING=FIELD PATTERN(DATE OF BIRTH));
Function (FIELD DATA FILE);
Function (PERFORM OVERLAY PRINTING);
Function (END OVERLAY PRINTING);
```

PRINTING METHOD AND INFORMATION PROCESSING APPARATUS FOR TRANSMITTING PRINTING INSTRUCTION TO PRINTING APPARATUS FOR CAUSING THE PRINTING APPARATUS TO PERFORM RECORDING USING A TRANSPARENT RECORDING MATERIAL

BACKGROUND OF THE INVENTION

1. Field of the Invention

The present invention relates to overlay printing in which a form and text data are printed in such a manner that the text data is overlaid on the form.

2. Description of the Related Art

In service systems for printing forms, such as "written estimates" and "written applications", editing and approval processing is often performed on printed paper.

After paper is printed, necessary information such as personal information may be filled in a specific region of the paper.

In addition, in the case of printing forms, a large number of sheets of thin paper may be used.

Printing techniques employing transparent recording materials are generally categorized into "techniques for performing printing on a print object" represented by (1) and (2) and a "technique for applying gloss to a printed material" represented by (3). Transparent recording materials have a characteristic of adding a colorless and transparent image having no pigment and are typified by transparent (clear) toners and transparent (clear) ink.

(1) Waterproofing processing is performed by coating a surface of a recording medium with transparent surface treatment liquid so that a recorded image is not degraded due to bleeding or leakage of recording ink ejected from a recording head of an inkjet recording apparatus (see, for example, Japanese Patent Laid-Open No. 01-085766).

(2) An ink receptive layer having an excellent transparency is formed in a necessary portion of a sheet base material such as a plastic film or a plastic card so that inkjet ink printing can be performed (see, for example, Japanese Patent Laid-Open No. 2004-223762).

(3) The glossiness of an image region where an image or a letter is formed in a printed material is changed by using a transparent toner that can provide an appropriate gloss or by adding a member for increasing the gloss to the image region (see, for example, Japanese Patent Laid-Open No. 2007-052175).

For example, when a user writes letters with a fountain pen on a thin sheet of paper, ink may bleed through to the back of the sheet of paper. Thus, a phenomenon called "strike through" in which ink is adhered to another sheet of paper or a desk under the sheet of paper may occur.

As described above, depending on the combination of the type of paper and the type of a writing material used by a user, strike through in which ink bleeds through to the back of the paper may occur.

SUMMARY OF THE INVENTION

The present invention can prevent occurrence of strike through, irrespective of the combination of the type of paper and the type of a writing material used by a user.

A printing method according to an aspect of the present invention for performing printing of paper having a user entry field, which is a region into which a user performs writing after printing is performed, includes setting a transparent recording material setting for the user entry field; and causing a printing unit to perform recording, by using a transparent recording material, for the user entry field for which the transparent recording material setting has been set.

Accordingly, a transparent recording material setting is set for a user entry field for which recording using a transparent recording material has been instructed, and recording using the transparent recording material can be performed.

In addition, in the printing method, when it is determined that data is to be printed in the user entry field, the transparent recording material setting is automatically released. Thus, occurrence of strike through in which ink bleeds through to the back of the paper can be prevented.

In addition, in the printing method, since recording using the transparent recording material need not be performed for regions outside of the user entry field, consumption of the transparent recording material can be reduced.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram showing an example of the configuration of the overlay printing system.

FIGS. 4A to 4C illustrate examples of display images to be used for setting of transparent recording material processing for a designated region (field pattern) in a form.

DESCRIPTION OF THE EMBODIMENTS

Embodiments of the present invention will be described with reference to the drawings.

In an embodiment of the present invention, printing is performed by overlaying text data on a form created by a form creation apparatus. Such printing processing is called "overlay printing".

General overlay printing will be explained first.

First, a form creation apparatus creates a form. A laser printer or the like having a function of creating a form is used to create a form.

A configuration including frames and the like in a form is registered in advance as form information in a form information file.

The form information is created by a form information design system.

In general, the form information includes a form pattern, which is a fixed pattern not depending on field data; and a field pattern, which is a pattern indicating received field data in accordance with a designated output format.

In addition, text data to be input into a form is created. The text data includes field data to be input into a designated region of the form. Then, when the field data is input into the form and is printed, print data in which the field data is overlaid on the form created from the form information is created and then is printed as an output form. Printing the form and the field data in such a manner that the field data is overlaid on the form is called "overlay printing".

This printing method is used, for example, for creating forms.

Figure 1:
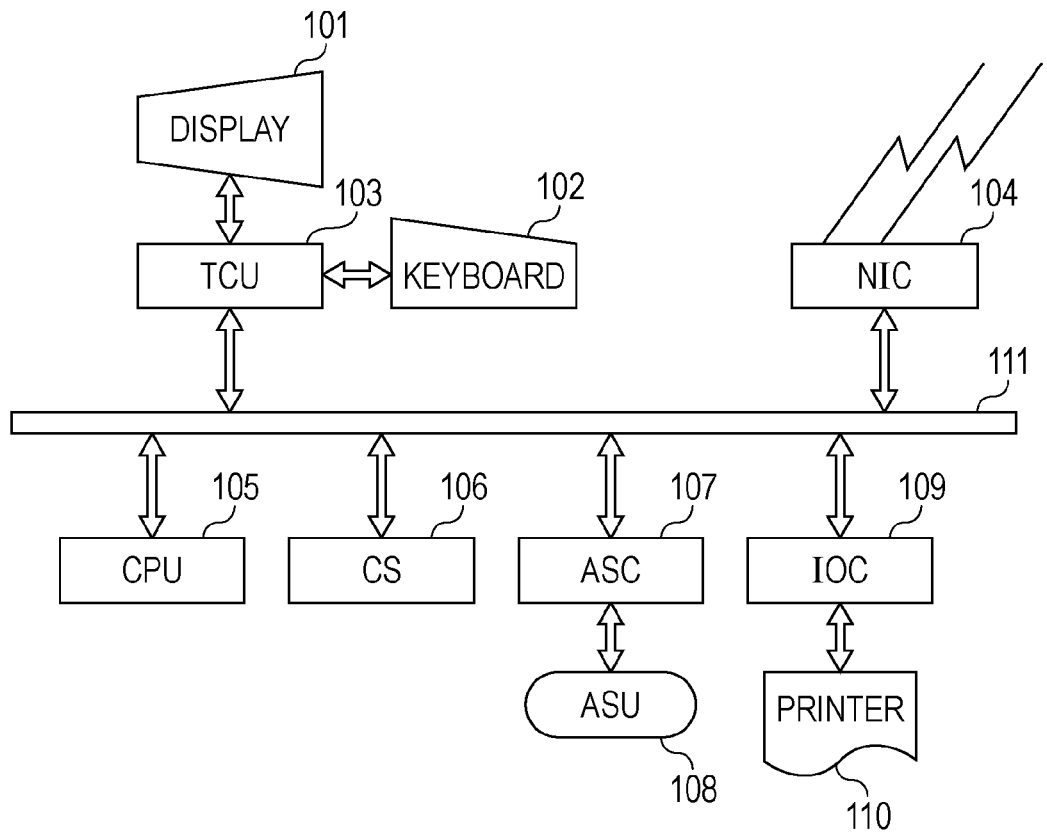
FIG. 1 shows an example of the configuration of a computer system in which a form information design system and an overlay printing system operate.

FIG. 1 illustrates a computer system.

Referring to FIG. 1, a central processing unit (CPU) 105 controls an operation of the entire computer system in accordance with a control program stored in a central storage (CS) 106.

An application program loaded from an auxiliary storage unit (ASU) 108 via an auxiliary storage controller (ASC) 107 is stored in the CS 106.

A program for causing the computer system to operate as a form information design system and an overlay printing system is also stored in the CS 106.

When the control program and various application programs are loaded into the CS 106 under the control of the CPU 105, the control program and the various application programs are operated, via a system bus 111, by instruction devices described below.

A first instruction device is an operator console (terminal control unit (TCU)) 103 including a display unit 101 and a keyboard unit 102.

The display unit 101 displays an image on a display screen of a display or the like in accordance with an instruction from the CPU 105.

The keyboard unit 102 transmits an instruction from a user to the CPU 105. The keyboard unit 102 includes a pointing device.

A second instruction device is a network connection mechanism (network interface controller (NIC)) 104 for fetching, into the computer system, instruction information from an external computer system connected via a network such as a local-area network (LAN) or a wide-area network (WAN).

A printer 110 is connected to the computer system according to this embodiment via an input-output controller (IOC) 109.

Form information created and input by the above-described form information design system is registered in advance in a form information file of the printer 110.

After creating print data by overlaying text data, which is received from the computer system, on a form, which is created from the registered form information, and performing overlay printing, the printer 110 acquires an output form.

Figure 2:
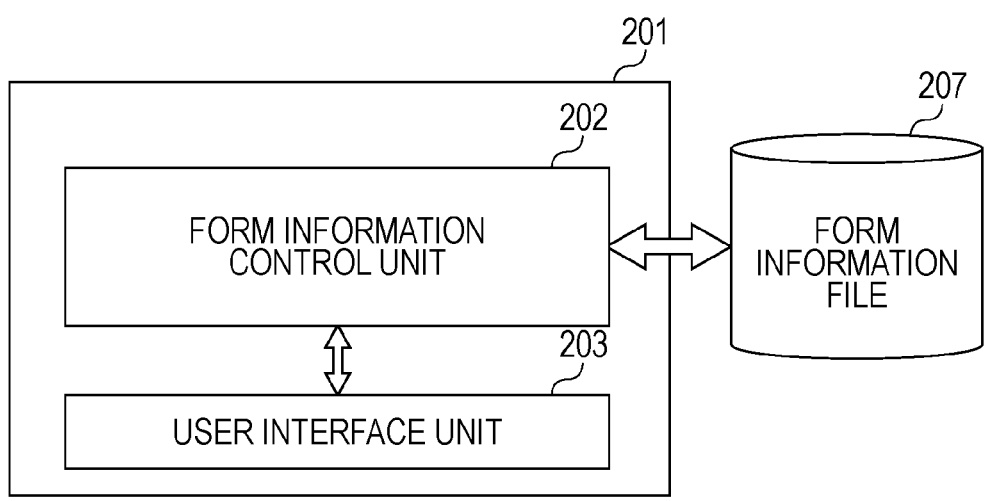
FIG. 2 is a block diagram showing an example of the configuration of the form information design system.

FIG. 2 illustrates a form information design system 201.

When a program for operating the form information design system 201 is loaded into the CS 106 under the control of the CPU 105, the CPU 105 operates as a form information control unit 202 of the form information design system 201 shown in FIG. 2.

A user interface unit 203 shown in FIG. 2 operates as the instruction devices 101 to 104 shown in FIG. 1.

In accordance with an instruction from the user interface unit 203, the CPU 105 controls the form information control unit 202 of the form information design system 201.

The form information control unit 202 displays, on the display unit 101, a form based on form information that is being designed.

The form information control unit 202 also receives various instructions, such as an instruction regarding settings and an instruction to create form information, input from a user via the user interface unit 203.

In addition, the form information control unit 202 creates form information based on information transmitted from the user interface unit 203 and creates a form information file 207. The form information file 207 is stored in the ASU 108.

Then, the form information control unit 202 determines, in accordance with a user instruction via the user interface unit 203, whether a transparent recording material setting and a transparent recording material detail setting have been set for a field pattern, an instruction to end editing of a form has been issued, or an instruction to register a form has been issued.

FIG. 3 is a block diagram showing an example of the configuration of an overlay printing system 301 according to this embodiment.

When a program for causing the overlay printing system 301 to operate is loaded into the CS 106 under the control of the CPU 105, the CPU 105 operates as the overlay printing system 301.

In accordance with an instruction from a user interface unit 303, the CPU 105 controls an overlay printing control unit 302 and a printer driver unit 304.

Here, the user interface unit 303 operates as the instruction devices 101 to 104 shown in FIG. 1.

The user interface unit 303 receives, from a user, an instruction to fetch the form information file 207 and a field data file 208 stored in the ASU 108. Text data including field data to be input into a form is stored in the field data file 208. The field data file 208 is created by the user and stored in the ASU 108.

Then, the user interface unit 303 transmits, to the overlay printing control unit 302, the instruction from the user to fetch the form information file 207 and the field data file 208.

Then, the overlay printing control unit 302 displays, on the display unit 101, a list of the names of the form information file 207 and the field data file 208.

The form information file 207 and the field data file 208 that have been selected by the user are output to the overlay printing control unit 302.

The overlay printing control unit 302 receives and reads the selected form information file 207 and field data file 208.

The overlay printing control unit 302 acquires form information and field data from the form information file 207 and the field data file 208, and creates print data in which the field data is overlaid on the form information.

The overlay printing control unit 302 creates the print data in such a manner that recording using a transparent recording material is performed for a region for which a transparent recording material setting has been set.

Finally, the overlay printing control unit 302 outputs the print data to a printer 305 via the printer driver unit 304.

In addition, the overlay printing control unit 302 registers the created form information into the printer 305.

Creation of Form Information File

Figure 6:
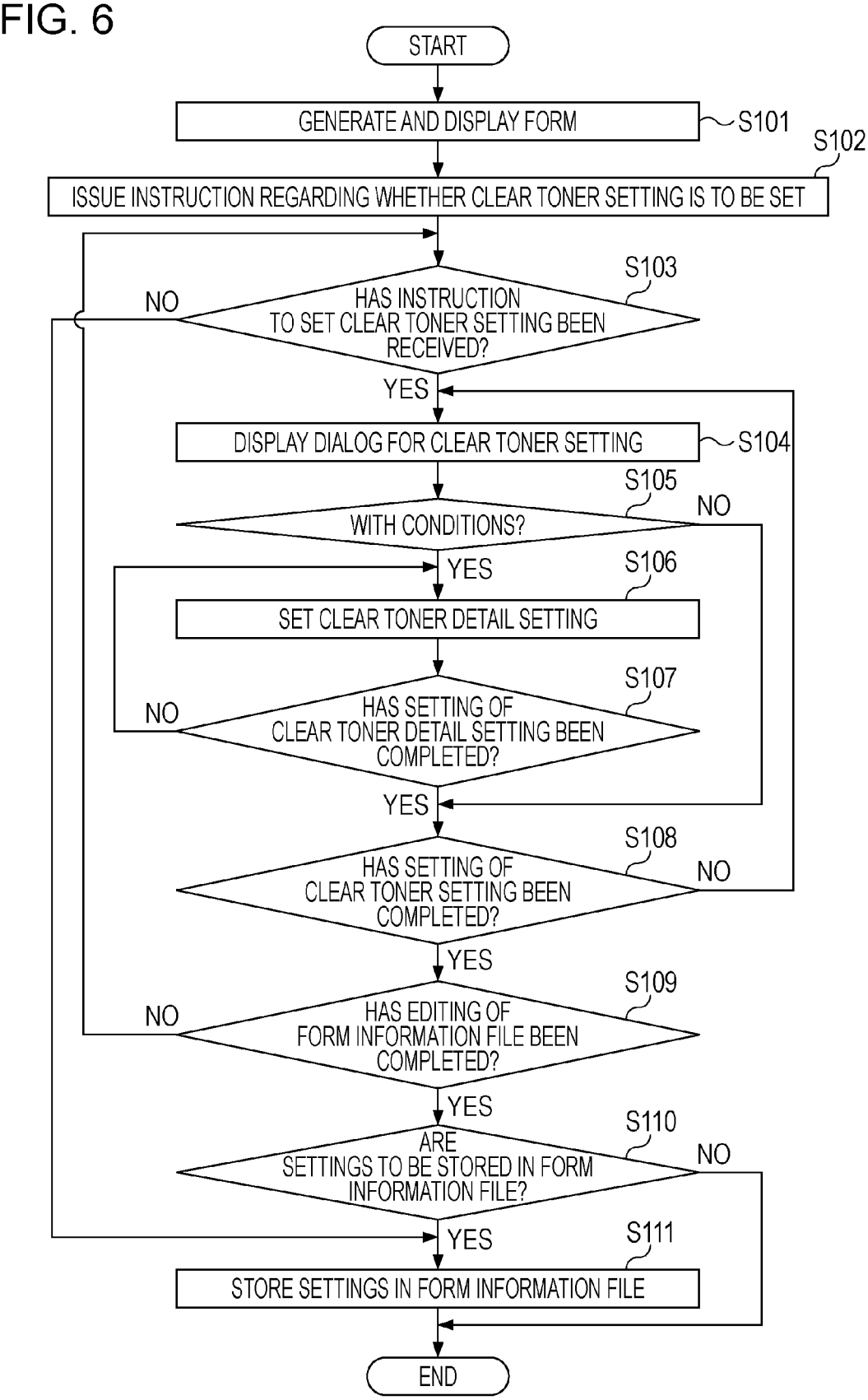
FIG. 6 is a flowchart showing a process to create a form information file according to some embodiments.

FIG. 6 is a flowchart showing a process performed by the form information design system 201 according to this embodiment to create a form information file 207.

The user interface unit 203 receives, from the user, designation of a form to be used.

The user interface unit 203 transmits information on the designated form to the form information control unit 202.

The form information control unit 202 creates, based on the transmitted information, a form information file 207 corresponding to the designated form.

In step S101, the form information control unit 202 creates a form based on the created form information file 207, and causes the created form to be displayed on the user interface unit 203.

The form displayed on the user interface unit 203 is, for example, an image 401 shown in FIG. 4A. In this example, a clear toner is used as a transparent recording material.

In step S102, the user issues an instruction regarding whether recording using a transparent recording material is to be performed for each field pattern 402, which is a designated region in the form displayed on the user interface unit 203. The instruction issued here is called a "transparent recording material setting instruction".

One field pattern is the minimum unit for which a transparent recording material setting can be set.

The field pattern may be a user entry field into which a user performs writing after a printed material is output.

Figure 4B:
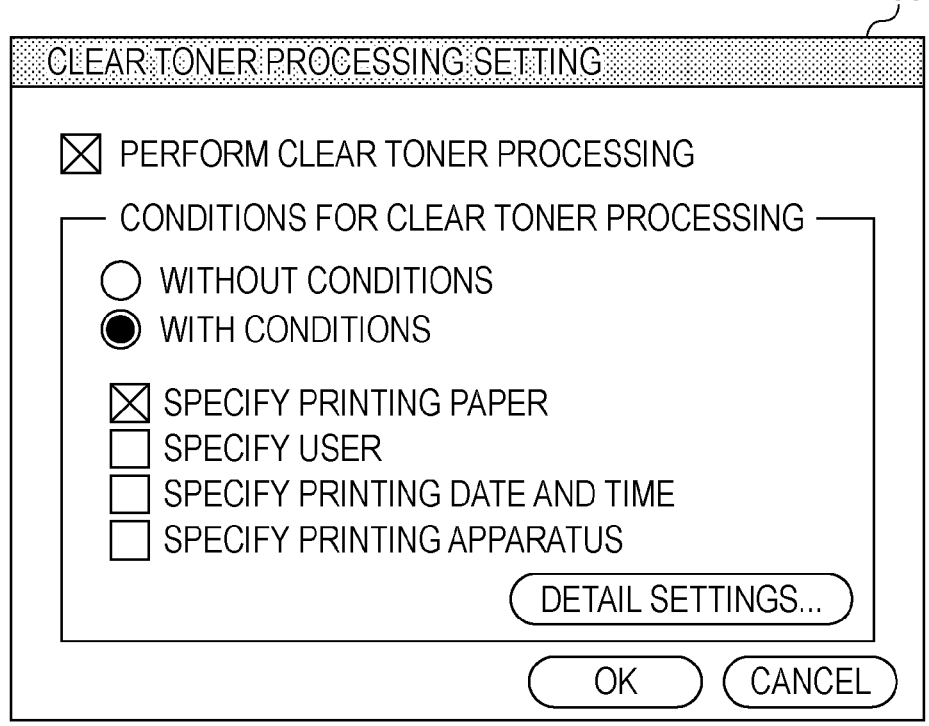

Here, a dialog shown in part of an image 403 of FIG. 4B is displayed on the user interface unit 203, and a check field for setting a transparent recording material setting is displayed.

In step S103, the form information control unit 202 receives, from the user via the user interface unit 203, an instruction regarding a setting of recording using a transparent recording material, and determines whether the setting information based on the user instruction indicates a setting to perform recording using a transparent recording material or a setting to not perform recording using a transparent recording material for a field pattern serving as a designated region in the form.

If the form information control unit 202 determines in step S103 that recording is to be performed using a transparent recording material, the process proceeds to step S104. If the form information control unit 202 determines in step S103 that recording is not to be performed using a transparent recording material, the process proceeds to step S111.

In accordance with a result of the determination, in step S104, the form information control unit 202 sets a transparent recording material setting for performing recording using a transparent recording material for the designated region.

Then, in accordance with the result of the determination, the form information control unit 202 also causes a dialog to be used for setting a transparent recording detail setting to be displayed on the user interface unit 203.

Figure 4C:
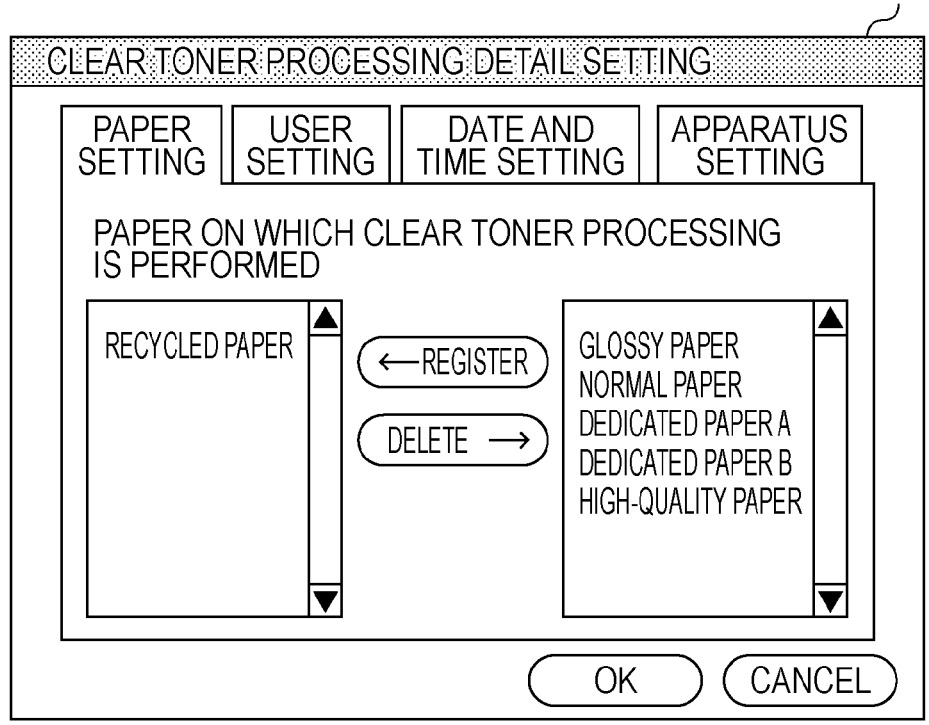

Examples of such a dialog are represented by part of the image 403 of FIG. 4B and an image 404 of FIG. 4C.

With the use of the dialog shown in part of the image 403, the user selects whether the transparent recording material setting is to be applied unconditionally or to be applied under a certain condition (step S105).

If the transparent recording material setting is applied under a certain condition, a transparent recording material detail setting is set in step S106.

For example, conditions regarding the type of printing paper to be used, a user who performs printing, a printing date and time, a printing apparatus to be used, and the like can be established.

In the case that any of the conditions is met, when overlay printing is performed, the transparent recording material setting becomes effective. If none of the conditions is met, the transparent recording material setting is released.

For example, as shown in the image 404 of FIG. 4C, in the case that paper on which recording using a transparent recording material is performed is set to "recycled paper", the transparent recording material setting becomes effective only when overlay printing is performed on recycled paper. In the image 404, in the case that a different type of paper is used, the transparent recording material setting is released.

With the use of the user interface unit 203, the user is able to issue an instruction to change settings in a dialog and to issue an instruction to confirm the setting.

The processing of steps S103 to S107 is performed until the transparent recording material setting and the transparent recording material detail setting have been completed (step S108).

In step S109, the form information control unit 202 determines whether processing for creating the form information file 207 has been completed.

If the form information control unit 202 determines in step S109 that the processing for creating the form information file 207 has been completed, the form information control unit 202 determines whether the transparent recording material setting and the transparent recording material detail setting set in steps S103 to S107 are to be stored in the form information file 207 in step S110.

If the form information control unit 202 determines in step S110 that the transparent recording material setting and the transparent recording material detail setting are to be stored in the form information file 207, the form information control unit 202 stores the transparent recording material setting and the transparent recording material detail setting in the form information file 207 in step S111.

Then, the processing regarding creation of the form information file 207 is completed.

Execution of Overlay Printing

Figure 7:
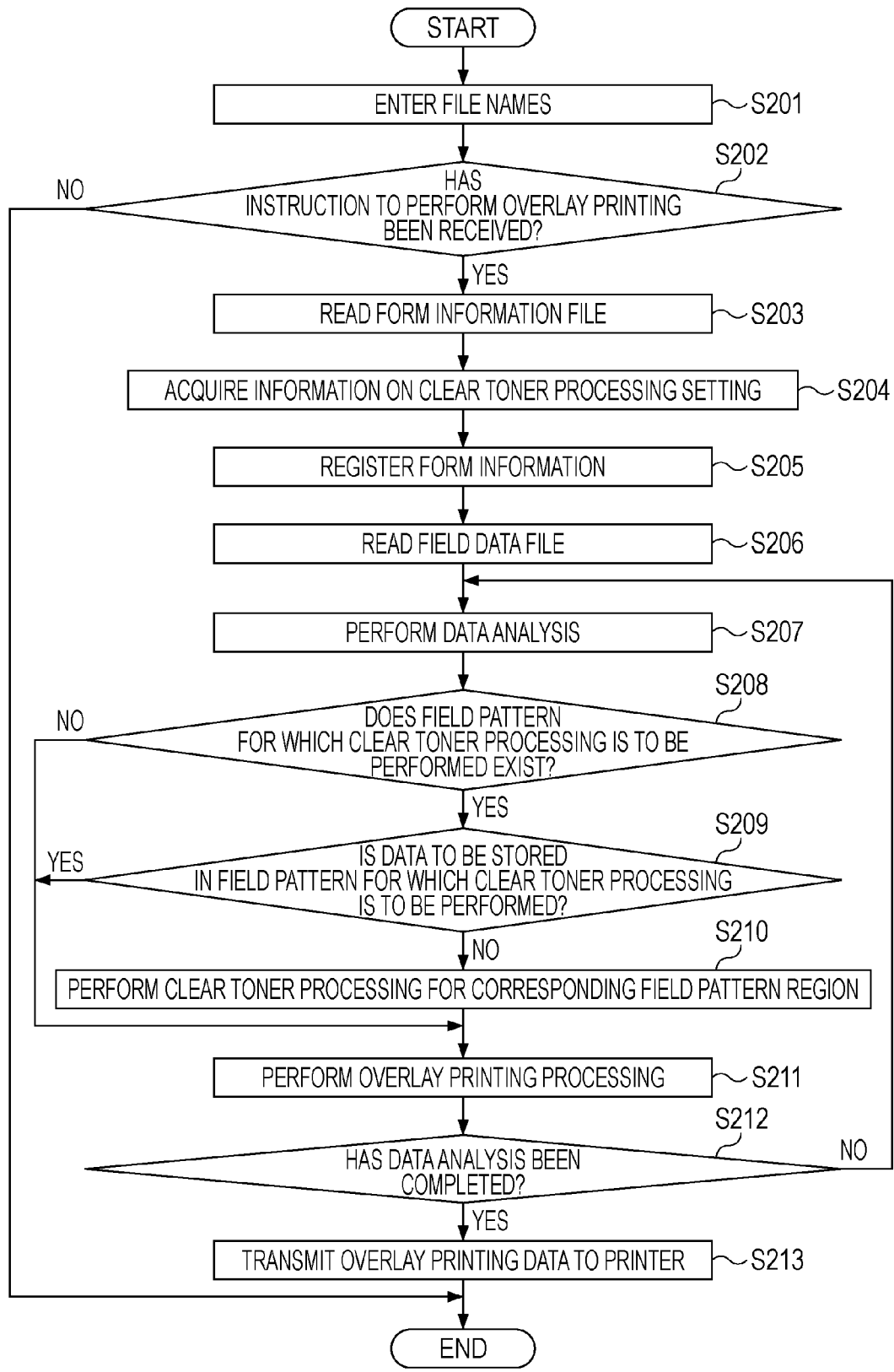
FIG. 7 is a flowchart showing a process to perform overlay printing in accordance with a transparent recording material setting in some embodiments.

FIG. 7 is a flowchart showing a series of operation processes to perform overlay printing processing in accordance with the above-described transparent recording material setting in the overlay printing system 301 according to this embodiment.

In step S201, the user interface unit 303 shown in FIG. 3 receives, from a user, the name of a form information file and the name of a text data file.

Then, the user interface unit 303 transmits the received names to the overlay printing control unit 302.

In step S202, the overlay printing control unit 302 determines, in accordance with the received information, whether an instruction to perform overlay printing has been issued from the user.

If the overlay printing control unit 302 determines in step S202 that the overlay printing instruction has not been issued, the process is terminated.

If the overlay printing control unit 302 determines in step S202 that the overlay printing instruction has been issued, the process proceeds to step S203.

In step S203, the overlay printing control unit 302 reads, based on the name of the form information file received via the user interface unit 303, a corresponding form information file 207.

Figure 5:
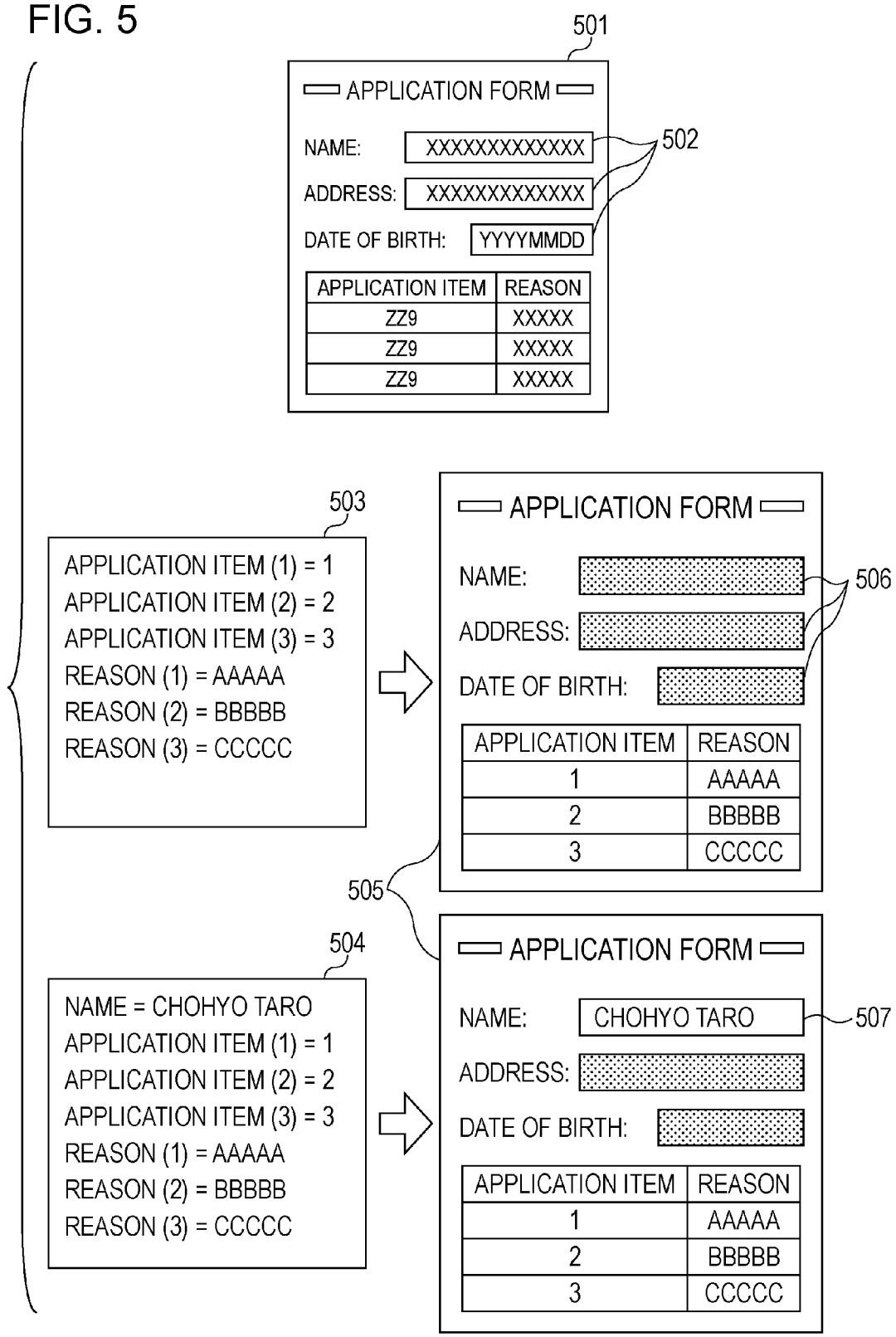
FIG. 5 shows an example of a result of overlay printing in which a field data file is designated for a form information file for which a transparent recording material setting has been set.

A form 501 shown in FIG. 5 is created based on the form information file 207.

In step S204, the overlay printing control unit 302 acquires, from the form information file 207, information on the transparent recording material setting and the transparent recording material detail setting created in steps S102 to S104.

In step S205, the form information file 207 containing the acquired information on the transparent recording material setting and the transparent recording material detail setting is registered by using a form registration function of the printer 305.

The user interface unit 303 receives, from the user, the name of a data file containing field data.

The user interface unit 303 transmits the name of the data file to the overlay printing control unit 302.

In step S206, the overlay printing control unit 302 reads, based on the received name of the data file, a corresponding field data file 208. Files 503 and 504 shown in FIG. 5 contain the field data.

In step S207, data analysis processing is performed in order to acquire data necessary for printing of one page.

In step S208, it is determined, in accordance with the information on the transparent recording material setting and the transparent recording material detail setting acquired in step S204, whether a field pattern for which recording using a transparent recording material is to be performed exists.

If it is determined in step S208 that the transparent recording material setting has been set for field patterns 502 shown in FIG. 5, the overlay printing control unit 302 determines whether the data acquired in step S206 is to be stored in the field patterns in step S209.

If it is determined in step S209 that the data is not to be stored in the field patterns for which the transparent recording material setting has been set, the process proceeds to step S210. In step S210, the overlay printing control unit 302 creates print data to perform recording by using a transparent recording material for the field patterns.

In the case of the file 503 shown in FIG. 5, since data is not designated for a "name" field pattern among the field patterns for which the transparent recording material setting has been set, data is not stored in the "name" field pattern. That is, no letter is printed in this field pattern.

In this case, the overlay printing control unit 302 creates print data 505 in such a manner that recording using a transparent recording material is performed for the field patterns 502.

In contrast, in the case of the file 504 shown in FIG. 5, since data is designated for the "name" field pattern among the field patterns for which the transparent recording material setting has been set, data is stored in the "name" field pattern. That is, letters are printed in this field pattern.

In this case, the overlay printing control unit 302 creates print data 505 in such a manner that the transparent recording material setting set for the field patterns 502 is released.

After such print data is created as described above, print data is created in step S211 to perform overlay printing processing in which the field data is overlaid on the form.

The processing of steps S207 to S211 is performed until data analysis processing for the field data file 208 has been completed (step S212).

Finally, in step S213, print data in which the field data is overlaid on the form is transmitted to the printer 305 via the printer driver unit 304, and a printing unit of the printer 305 performs printing of the print data.

Printing of the print data is performed by the printer 305 in such a manner that recording using a transparent recording material is performed for a field pattern for which a transparent recording material setting has been set.

An example of an output form, which is a result of overlay printing performed by designating a field data file for a form information file for which a transparent recording material setting has been set, is shown in FIG. 5.

A transparent recording material setting is set for field patterns 506 shown in FIG. 5, and no data is designated for any of the field patterns 506. Thus, the transparent recording material setting is not released, and an output form in which transparent recording material recording has been performed can be obtained.

Although a transparent recording material setting is set for a field pattern 507 shown in FIG. 5, data is designated for the field pattern 507. Thus, the transparent recording material setting is released, and an output form in which transparent recording material recording has not been performed can be obtained.

The field data is not necessarily overlaid on the form in step S211. Print data of the field data and print data of the form may be individually transmitted to the printer 305, and the field data may be overlaid on the form in the printer 305.

As described above, a transparent recording material is provided only for a field pattern serving as a user entry field into which a user performs writing after printing is performed (that is, a field pattern for which data is not designated).

Thus, even if a user fills in a field pattern by using a fountain pen or the like and ink is adhered to the field pattern, a transparent recording material serving as a film prevents the ink from bleeding through to the back of paper.

Thus, ink is prevented from bleeding through to the back of a user entry field into which the user performs writing, and thus occurrence of strike through can be prevented.

In addition, bleeding of ink on the surface of paper can also be prevented.

In some embodiments, clear toner processing setting for a field pattern is set via the user interface 203, and the setting details are stored in the form information file 207, as described above. In addition, overlay printing is performed by designating the form information file 207. In some embodiments, the processing described below is performed.

Figures 8A, 8B:
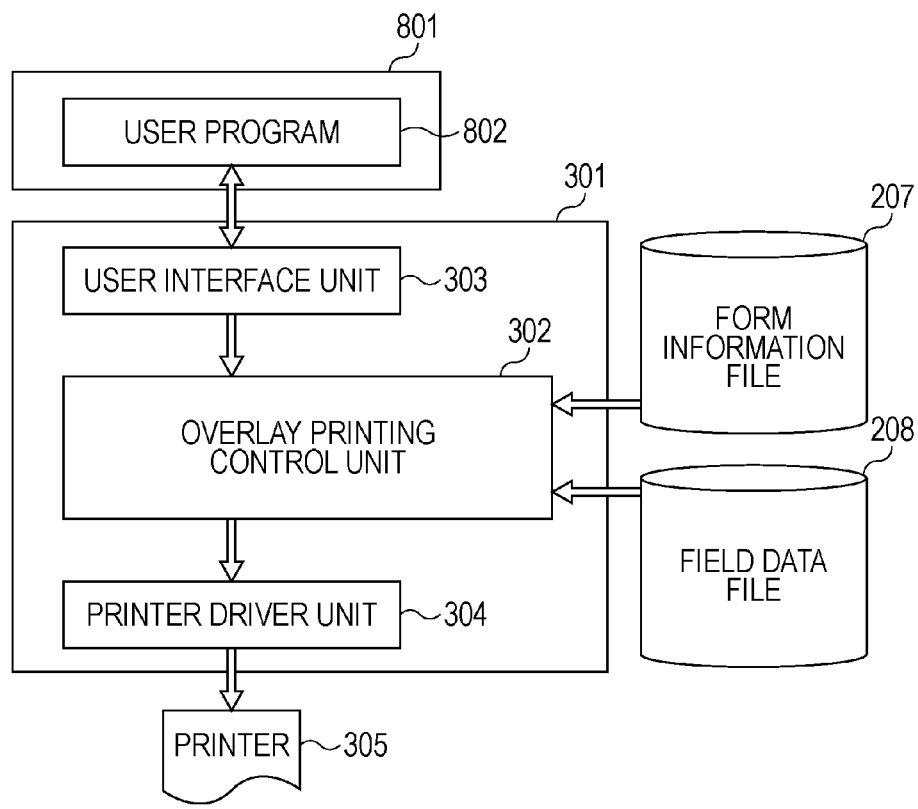
FIG. 8A is a block diagram showing an example of the configuration of a system in which a transparent recording material setting is dynamically set in accordance with a library function in a case where overlay printing is performed in some embodiments.
FIG. 8B illustrates an example of a library.

The overlay printing system 301 provides a function group 803 in a library format for designating various settings regarding recording using a transparent recording material, as shown in FIG. 8B.

By designating a desired function and causing the desired function to be implemented in overlay printing processing, the user is able to obtain a desired printing result.

FIG. 8A shows an example of some embodiments.

A mechanism for providing, in a library format, information on a series of settings regarding recording using a transparent recording material from a user program 802 existing in a user application 801 is provided.

A series of settings regarding recording using a transparent recording material are provided in a library format. Thus, a load to be imposed on the user when editing the form information file 207 can be reduced.

Furthermore, the amount of information stored in the created form information file 207 can be reduced. Thus, file access processing, which occupies most of the processing time, can be performed more efficiently. Therefore, the processing time can be reduced.

Moreover, various operation modes suitable for individual users' needs can be flexibly handled. Thus, the flexibility of the form information file 207 can be increased.

A processing method for causing a program for operating the configurations of the foregoing embodiments for attaining the functions of the foregoing embodiments to be stored in a computer-readable storage medium and causing the program stored in the computer-readable storage medium to be read as code and executed in a computer also falls within the scope of the foregoing embodiments. In addition, the program itself as well as the computer-readable storage medium in which the program is stored also falls within the scope of the foregoing embodiments.

The computer-readable storage medium may be, for example, a floppy disk, a hard disk, an optical disc, a magneto-optical disc, a compact disc read-only memory (CD-ROM), a magnetic tape, a nonvolatile memory card, a ROM, or the like.

In addition, not only a program single unit stored in the computer-readable storage medium and performing processing, but other types of software running on an operating system (OS) in cooperation with a function of an expansion board to achieve operations of the foregoing embodiments also fall within the scope of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-280437 filed Oct. 29, 2007, which is hereby incorporated by reference herein in its entirety.

What is claimed is:

1. A printing method for performing printing of paper having a user entry field, which is a region into which a user performs writing after printing is performed, the printing method comprising:
   setting, using a computer, a transparent recording material setting only for a user entry field which is a region on printed paper into which the user performs writing using ink;
   determining whether or not data to be printed exists in a user entry field set to be printed using a transparent recording material;
   in a case where the determining determines that data to be printed does not exist in the user entry field set to be printed using a transparent recording material, performing printing using the transparent recording material as being set for the user entry field; and
   in a case where the determining determines that data to be printed exists in the user entry field set to be printed using a transparent recording material, performing printing the data in the user entry field and controlling not to perform printing using the transparent recording material for the user entry field by releasing a transparent recording material setting set for the user entry field.

2. The printing method according to claim 1,
   wherein the paper is a form, and the user entry field is a minimum unit for which the transparent recording material setting can be set in the form.

3. The printing method according to claim 1,
   wherein the transparent recording material setting becomes effective when a designated condition is met in the case of performing printing.

4. The printing method according to claim 3,
   wherein the designated condition is a type of paper to be used for printing, a user who issues an instruction to perform printing, a date and time on which printing is performed, or an apparatus that performs printing.

5. The printing method according to claim 1,
   wherein information on the transparent recording material setting is provided in a library format.

6. An information processing apparatus for instructing a printing apparatus to perform printing of paper having a user entry field, which is a region into which a user performs writing after printing is performed, the information processing apparatus comprising:
   a transparent recording material setting unit configured to set a transparent recording material setting only for a user entry field which is a region on printed paper into which the user performs writing using ink;
   a determination unit configured to determine whether or not data to be printed exists in a user entry field set to be printed using a transparent recording material; and
   a printing unit configured to cause the printing apparatus to, in a case where the determination unit determines that data to be printed does not exist in the user entry field set to be printed using a transparent recording material, perform printing using the transparent recording material as being set for the user entry field, and in a case where the determination unit determines that data to be printed exists in the user entry field set to be recorded using a transparent recording material, to print the data in the user entry field and to control not to perform printing using the transparent recording material for the user entry field by releasing a transparent recording material setting set for the user entry field.

7. A non-transitory computer-readable storage medium storing a program for causing a computer to perform a method for performing printing of paper having a user entry field, which is a region into which a user performs writing after printing is performed, the method comprising:
   setting a transparent recording material setting only for a user entry field which is a region on printed paper into which the user performs writing using ink;
   determining whether or not data to be printed exists in a user entry field set to be printed using a transparent recording material;
   in a case where the determining determines that data to be printed does not exist in the user entry field set to be printed using a transparent recording material, performing printing using the transparent recording material as being set for the user entry field; and
   in a case where the determining determines that data to be printed exists in the user entry field set to be printed using a transparent recording material, performing printing the data in the user entry field and controlling not to perform printing using the transparent recording material for the user entry field by releasing a transparent recording material setting set for the user entry field.

* * * * *